No. 741,517. PATENTED OCT. 13, 1903.
T. MACALPINE.
REFINING MINERAL OILS.
APPLICATION FILED SEPT. 8, 1902.
NO MODEL.
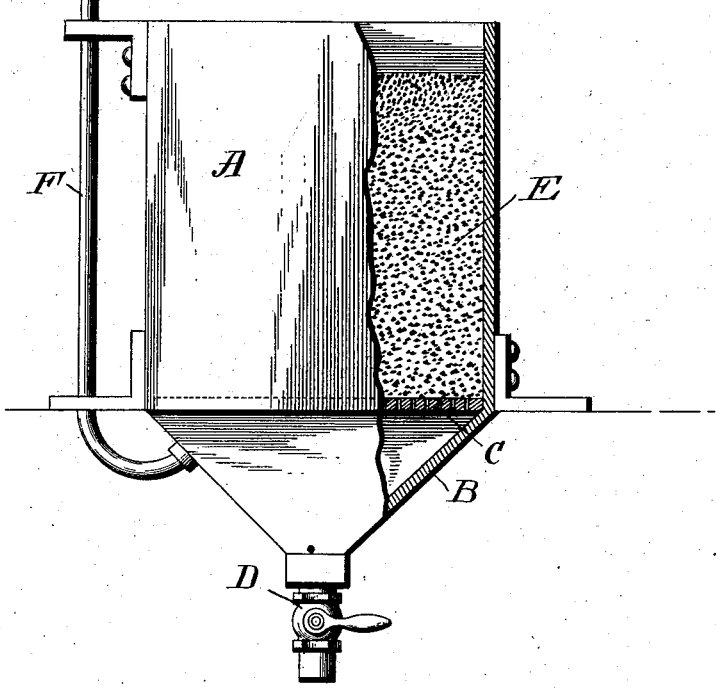
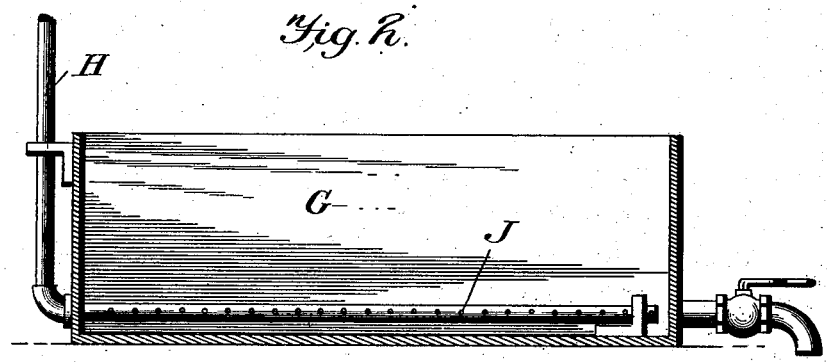

No. 741,517. Patented October 13, 1903.

UNITED STATES PATENT OFFICE.

THOMAS MACALPINE, OF CHISWICK, ENGLAND, ASSIGNOR TO ALCOHOL SYNDICATE, LIMITED, OF LONDON, ENGLAND.

REFINING MINERAL OILS.

SPECIFICATION forming part of Letters Patent No. 741,517, dated October 13, 1903.

Application filed September 8, 1902. Serial No. 122,627. (No specimens.)

*To all whom it may concern:*

Be it known that I, THOMAS MACALPINE, a subject of the King of Great Britain, residing at Chiswick, England, have invented certain new and useful Improvements in Refining Mineral Oils; and I do hereby declare the following to be a full, clear, and exact description of the invention, such as will enable others skilled in the art to which it appertains to make and use the same.

This invention relates to the treatment of crude mineral oil with a saline solution previous to distillation or to the treatment of distillates of such oil with a saline solution previous to further distillation or to the final treatment of distillates of such oil.

The saline treatment of crude oil previous to distillation, as hereinafter described, gives the following results, as I have ascertained by extensive experiments. After such treatment the oil before distillation and during distillation can be more easily and completely oxidized. The oil by absorbing oxygen is both before and during distillation caused to be purged of certain objectionable impurities—namely, acids, resinous matters, and tarry substances—which remain in the still during distillation and are thus prevented from being carried over with the distillate. Consequently the oil obtained is of an increased purity and is thus better for illuminating and lubricating purposes. Moreover, the treatment of distilled oil, as now sold, by subjecting it to the action of a saline solution, as hereinafter described, will improve its commercial value by causing it to give a higher illuminating power when used in domestic lamps, and further improvement can be added to the oil by oxidizing it after the saline treatment. The advantage of the saline treatment is also applicable to lubricating-oils by removing acid and gumming matters. The saline treatment gives identical results when applied to any class of mineral oil at present known without other variations of treatment than is hereinafter stated.

In carrying my invention into practice it is important that the oil should be subdivided as much as possible in order to enable the saline solution to come into as intimate a contact as possible with each particle of the oil, and the best plan I have found to do this is to pass the oil into a mass of granular substances previously immersed in a saline solution.

In the accompanying drawings, which show an apparatus for carrying out my invention, Figure 1 is a side elevation, partly in section, of devices for subjecting the oil to the action of the solution used and to the action of air; and Fig. 2 is a section of a device in which the oil is oxidized.

I first provide a vessel A, Fig. 1, having a tapered bottom B, at the upper part of which is arranged a grid or perforated false bottom C. Near the apex of the tapered bottom is fitted a draw-off cock D. I nearly fill this vessel with a coarse granular substance E, such as coarse granular coke, coarse sand, or coarse powdered charcoal. I then prepare a saline solution by saturating water with sodium chlorid and carbonate of sodium in the proportion of their chemical combining weights. I then pour into the vessel A as much of the saline solution as it will hold and allow it to remain a few minutes and then draw the same off by opening the cock D in the bottom. When all of the solution that will drain off has done so, I close the cock and run into the vessel as much crude mineral oil or a distillate of it as the vessel will hold and allow it to remain in the vessel from one to ten hours, according to the density of the oil, one hour being sufficient for an oil not exceeding .800 specific gravity. To prevent the granular substance from getting clogged, and to continuously divide the oil as much as possible, and to partially oxidize the oxidizable parts of the oil, I blow air through the granular substance and oil during the whole time the oil is in the vessel. This is done by the pipe F, connected to a suitable supply of air under necessary pressure, usually about ten pounds to the square inch, this pressure, however, being more or less, according to the depth of the granular substance. The volume of air to a vessel in diameter of six feet by twelve feet in height may be such as will be supplied by a two-inch pipe and a pressure of ten pounds to the square inch. The air, of course, is delivered underneath the false bottom C.

After the oil has been treated as above described it is drawn off from the vessel A and run into a tank G, Fig. 2, and subjected to an oxidizing process. This oxidation may be effected by blowing air into it through the pipe H, the lower portion being perforated with small holes J, the said pipe being connected to a suitable supply of air under pressure. This air agitation is continued for about one hour. After the oil has been agitated by air, as described, it is run into the still and distilled in the usual way, or in place of oxidizing by air I may oxidize the oil by agitating it in a solution composed of one pound of permanganate or manganate of potassium or sodium to one hundred pounds of water for about two hundred pounds of oil, the agitation being effected by any known and suitable mechanical means or by blowing air through it, the said agitation being continued for about one hour. After this the oil, if crude oil is under treatment, is distilled.

I prefer to further oxidize the oil in the still by mixing with it the special preparation of manganese made according to the specification of my previous patent, No. 686,663, using about five pounds of the manganese preparation to one hundred pounds of oil, and at the same time I also prefer passing into the oil during the distillation the low-temperature steam, as described in the specification of my previous patent, No. 664,813.

Instead of using the granular substance and saline solution before stated I may fill the vessel A about two-thirds full of a mixture of small crystals of sodium carbonate and sodium chlorid in the proportion of their chemical combining weights and then add as much water as the vessel will hold and allow it to remain in contact with the crystals for about two hours. I then draw off the solution and charge the vessel with crude mineral oil or a distillate of it and allow the oil to remain in the vessel in contact with the crystals for from one to ten hours, according to the density of the oil, the heaviest oils requiring the longest time.

For oils containing a large amount of certain impurities—namely, acids, resinous matters, and tarry substances—the saline treatment of the oil may be repeated a second time before the latter is passed into the tank G to be oxidized by air or the solution of permanganates or manganates.

When I subject oil that has been previously distilled to the saline treatment, I may run the oil after the saline treatment directly into the still for further distillation without subjecting it to the immediate oxidation by air or the permanganates, or I may simply only subject it to the saline treatment without further distillation.

When treating heavy oils, before running them into the vessel A, I may thin them in order to avoid clogging the granular substance by mixing into them a light mineral oil, such as benzin, approximately one part benzin to three parts of the oil to be treated.

I prefer to have the contents of the vessel A while at work at a temperature of not less than 60° Fahrenheit; but I can increase the speed of the operations by raising the temperature of the contents of the vessel A—say up to 150° Fahrenheit—by blowing in hot air, for example.

The essential and most important feature of my invention is the treatment of mineral oils, by which I mean petroleum oils generally, or the treatment of distillates thereof with a saline solution.

Having thus described my invention, what I claim as new, and desire to secure by Letters Patent of the United States, is—

1. In the process of refining mineral oil whether crude oil or distillates thereof, the step which consists in subjecting said oil for a considerable time to the action of a solution composed of salt and carbonate of soda, said oil being kept in a state of subdivision during said time, substantially as described.

2. The process of refining mineral oil, which consists in treating crude mineral oil with a saline solution of the character described, for a considerable time, simultaneously blowing air therethrough, to maintain said oil in a state of subdivision, oxidizing said treated oil and afterward distilling it, substantially as described.

3. The process of refining mineral oil, which consists in treating crude mineral oil with a saline solution of the character described, for a considerable time, simultaneously blowing air therethrough, oxidizing said treated oil and finally oxidizing and distilling said oil at the same time, substantially as described.

4. The process of refining mineral oil, which consists in subjecting crude mineral oil for a considerable time to the action of a saline solution composed of salt and carbonate of soda dissolved in water, simultaneously blowing air therethrough in order to maintain the oil in a state of subdivision, said solution being also kept in a subdivided state by means of a granular substance, oxidizing said treated oil and finally oxidizing and distilling said treated oil at the same time, substantially as described.

5. The process of refining mineral oil, which consists in treating crude mineral oil with a saline solution, and then oxidizing certain of the impurities in said oil and finally distilling said oil in the presence of a manganese compound, substantially as described.

6. The process of refining mineral oil, which consists in treating crude mineral oil with a saline solution, then oxidizing certain of the impurities of the oil and distilling said oil in the presence of a manganese compound and during distillation passing into said oil steam of low temperature, substantially as described.

7. The process of refining mineral oil, which consists in subjecting crude mineral oil for a considerable time to the action of a saline solution, composed of a saturated solution of common salt and carbonate of soda, blowing air therethrough during the preceding step to maintain the oil in a state of subdivision, said solution being also kept in a subdivided state by means of a granular substance, blowing air through said oil after the treatment with the saline solution, and finally distilling said oil in the presence of an oxidizing manganese compound, substantially as described.

THOMAS MACALPINE.

Witnesses:
 FREDERIC PRINCE,
 I. MACLEAN AUKETT.